United States Patent [19]

Kondo

[11] Patent Number: 4,571,633
[45] Date of Patent: Feb. 18, 1986

[54] HIGH-SPEED FACSIMILE MACHINE CAPABLE OF PARALLEL PROCESSING

[75] Inventor: Mitsuru Kondo, Sagamihara, Japan

[73] Assignee: Ricoh Company, Ltd., Japan

[21] Appl. No.: 512,416

[22] Filed: Jul. 8, 1983

[30] Foreign Application Priority Data

Jul. 12, 1982 [JP] Japan ................................ 57-120806

[51] Int. Cl.⁴ .......................... H04N 1/40; H04N 1/46; H04N 1/32
[52] U.S. Cl. ...................................... 358/280; 358/78; 358/257; 382/56
[58] Field of Search .................... 358/78, 257, 280; 382/56

[56] References Cited

U.S. PATENT DOCUMENTS

| | | | |
|---|---|---|---|
| 4,158,861 | 6/1979 | Iizuka | 358/257 |
| 4,196,450 | 4/1980 | Miller et al. | 358/280 |
| 4,264,932 | 4/1981 | Minamibayashi et al. | 358/280 |
| 4,449,149 | 5/1984 | Ogawa et al. | 358/280 |

Primary Examiner—Howard W. Britton
Assistant Examiner—John K. Peng
Attorney, Agent, or Firm—Guy W. Shoup

[57] ABSTRACT

A facsimile communication machine capable of transmitting and receiving coded picture data is provided. The machine comprises a system control unit including a pair of CPUs, one of which is capable of controlling the reading operation while the machine is in transmission mode and the recording operation while the machine is in receiving mode and the other of which is capable of controlling the coding operation while the machine is in transmission mode and the decoding operation while the machine is in receiving mode. With the use of such a pair of CPUs, parallel processing of reading and coding operations and of decoding and recording operations can be carried out, thereby allowing to significantly increase operational speed.

6 Claims, 9 Drawing Figures

HIGH-SPEED FACSIMILE MACHINE CAPABLE OF PARALLEL PROCESSING

BACKGROUND OF THE INVENTION

1. Field of the Invention

This invention relates to a data communication apparatus, and, in particular, to a high-speed facsimile machine capable of carrying out a plurality of functions at the same time thereby allowing to shorten the data processing time period. More in particular, the present invention relates to a facsimile machine of the band compression type in which communication of data is carried out in the form of codes. Still more specifically, the present invention is concerned with a facsimile communication machine provided with a system control unit including a pair of one-chip micro-CPUs, wherein it is so structured that one of the CPUs is capable of controlling the reading operation while the machine is in transmission mode and of controlling the recording operation while the machine is in receiving mode and the other CPU is capable of controlling the coding operation while the machine is in transmission mode and of controlling the decoding operation while the machine is in receiving mode, thereby allowing to increase the data processing speed.

2. Description of the Prior Art

In general, in a facsimile machine which carries out communication with the use of coded data, various control functions are required such as I/O device control, sequence control, protocol control, data compressing and restoring control in a MH or MR coding system, operating port control, scanner unit control, MODEM control, recording head driver control and power supply sequence control. These control functions are usually carried out under the supervision of a system control unit provided in the facsimile machine.

When such a system control unit is structured to have a single micro-CPU, there is a limit in data processing speed. However, as well known in the art, by constructing a part of such a system control unit in the form of so-called firmware, for example for that portion of the unit which carries out the steps, after reading picture information by a scanner, of run-length counting, coding and generation of data transmission format, or for that portion of the unit which carries out the steps, after transfer of received picture data to a micro-CPU through a bus, of decoding the received picture data, conversion to picture information and transfer of data to a recording device, there may be provided a facsimile machine including a single micro-CPU, which has the ability of MODEM rate 4,800 bps and 20 ms/line of I/O speed in the MH coding system.

Furthermore, also well known is a facsimile control method wherein, in order to increase the data processing speed, use is made of two micro-CPUs thereby allowing to carry out picture signal control in the form of parallel processing format with assigning communication and terminal controls or transmitting and receiving controls to respective CPUs. According to such a facsimile control method, it is true that the data processing speed may be increased by the factor of 1 to 2 as compared with the above-described approach depending on the nature of an original to be transmitted. However, such a method cannot guarantee an increase in processing speed of twice or more.

Thus, there has been a need to further increase the data processing speed of a facsimile machine.

SUMMARY OF THE INVENTION

In accordance with the present invention, there is provided a high-speed facsimile machine which can carry out the data processing operation at an extremely high rate. In accordance with a specific embodiment of the present invention, there is provided a facsimile communication machine having the ability of at least 9,600 bps of MODEM rate and 10 ms/line of I/O speed in a MH or MR coding system.

Briefly stated, the present invention provides a facsimile communication machine of the type in which communication is carried out using coded data, the facsimile machine comprising a pair of line memory blocks each capable of storing raw data read by a scanner at least for a single scanning line and a system control unit including a pair of micro-CPUs, in which it is so structured that one of the pair of CPUs mainly controls the reading operation while the machine is in transmission mode and the recording operation while the machine is in receiving mode, and, on the other hand, the other CPU mainly controls the coding operation while the machine is in transmission mode and the decoding operation while the machine is in receiving mode. With such a structure, each of the pair of line memory blocks and each of the pair of CPUs can be connected through a data bus switchingly as desired, so that transmission of data between elements may be partly omitted, and, moreover, a time period for parallel processing of data reading and coding operations during transmission mode and of received data decoding and recoding operations during receiving mode may be increased, thereby allowing to enhance operational speed.

Therefore, it is a primary object of the present invention to provide an improved facsimile communication machine.

Another object of the present invention is to provide a high-speed facsimile communication machine having a pair of central processing units ( CPUs ) and a pair of memory units, each of which is switchingly connected to each of the CPUs.

A further object of the present invention is to provide a high-speed facsimile communication machine capable of carrying out communication using coded data at an increased speed.

A still further object of the present invention is to provide a facsimile communication machine which can process picture data at an increased rate without complication in structure.

A still further object of the present invention is to provide a facsimile communication machine in which data transmission time is minimized.

A still further object of the present invention is to provide a facsimile communication machine which allows to carry out parallel processing for an extended period of time, thereby increasing speed of operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
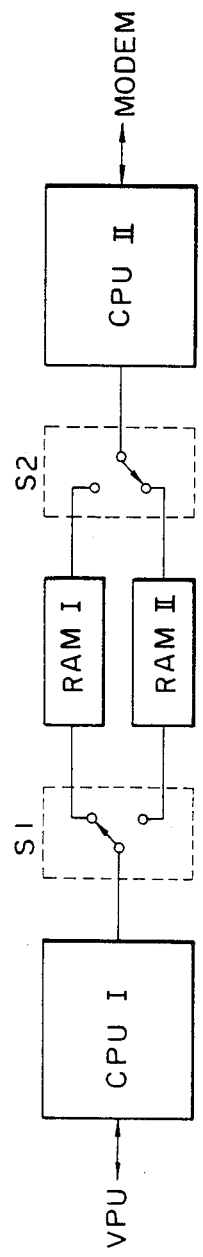
FIG. 1 is a block diagram illustrating the main structure of a facsimile communication machine embodying the present invention.

Referring now to FIG. 1, there is shown in block form the main structure of a facsimile communication machine constructed in accordance with the present invention. As shown, there are provided a pair of central processing units CPU I and CPU II, forming a part of the system control unit of the present facsimile machine, a pair of random access memory (RAM) blocks RAM I and RAM II and a pair of switching devices S1 and S2 for controlling the connection between the CPUs and RAMs. CPU I is connected to a read processing unit VPU and CPU II is connected to a MODEM. CPUs I and II are each, preferably, comprised of one-chip micro-CPU, e.g., of the 8085A type.

Of importance, it is so structured that CPU I has the function of controlling at least the reading operation while the machine is in transmission mode and the recording operation while the machine is in receiving mode, and, on the other hand, CPU II has the function of controlling at least the coding operation while the machine is in transmission mode and the decoding operation while the machine is in receiving mode. Of course, each of CPUs I and II may have additional controlling functions as desired.

Each of RAMs I and II has a memory storage capacity capable of storing at least one line of data read by a scanner, i.e., raw picture data which has not yet been subjected to coding. A pair of RAM blocks RAM I and RAM II define a memory unit, the data stored in which are commonly used by a pair of CPUs I and II. In such a memory unit, data are stored with a line as a unit or a block comprised of a plurality of lines as a unit. During transmission, the data read by a scanner are supplied to RAMs I and II alternately and coded; on the other hand, during reception, the data received are supplied to RAMs I and II alternately and decoded, as will be described in detail later. Such an alternate supply of data is implemented by operating the switches S1 and S2 to change connection of CPUs I and II and RAMs I and II to the data bus.

For example, the switches S1 and S2 are operated to switch connection of CPUs I and II to the data bus, so that the data read by a scanner (not shown) and stored into RAM I are coded by CPU II. At the same time, RAM II, which has outputted coded data stored therein to a remote terminal in communication through MODEM, now receives data read by the scanner in sequence and stores therein. In this manner, in accordance with the present invention, there are provided a pair of RAM memory blocks, RAMs I and II, which are commonly used by a system control unit including a pair of CPUs I and II, each assigned with predetermined functions so as to allow both of the CPUs operated in parallel with different functions, so that simply by switching bus connection to each of the CPUs, the raw data read and stored in one of the RAMs can be coded by the CPU now in connection through the switch. For this reason, there is no need to transfer data to the CPU in charge of coding operation, thereby allowing to carry out reading and coding operations in parallel.

Similarly, in the case of receiving mode, the RAM which has received coded data is connected to CPU II in charge of decoding operation to decode the data received in sequence and the thus decoded data are again stored into the same RAM for temporary storage, during which the RAM now connected to CPU I in charge of recording operation supplies previously decoded data to a plotter (not shown). It should thus be understood that the parallel processing of decoding and recoding operations can be carried out in the present invention.

Figure 2:
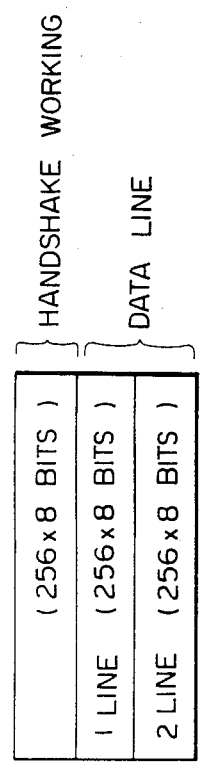
FIG. 2 is schematic illustration showing the structure of each of a pair of random access memory (RAM) blocks shown in FIG. 1.

FIG. 2 schematically illustrates the structure of one example of a RAM which may be used in the present invention. In the example shown in FIG. 2, a single RAM block has a capacity capable of storing raw data for three lines (e.g., scanning lines) with each line having 256×8 bits. The top line in the RAM of FIG. 2 is a handshake working area which is used to receive a command status signal or other signals and the following two lines are data lines for storing therein picture data for two lines.

Describing the operation in transmission mode as an example, when the connection condition between the CPUs and RAMs is established as shown in FIG. 1, CPU I is connected to RAM I and thus CPU I controls the scanner processing unit VPU thereby causing the data read and suitably processed by VPU to be stored into RAM I, and, at the same time, since CPU II is connected to RAM II, CPU II causes the data stored in RAM II to be coded and the thus coded data to be stored again into RAM II while also supplying the thus coded data to MODEM. In this manner, reading and coding operations are carried out in parallel.

Next, the system control unit including a pair of CPUs will be described especially with respect to an example of division of functions between the two CPUs.

In an example, first system control unit segment SCU I including CPU I has the following functions.

(1) Transfer of data from a scanner and storage into CPUs and RAMs.

(2) Transfer of the data temporarily stored into CPUs and RAMs to a WE (Write Enable) section.

(3) OR processing of scanner data.

(4) Formation of TTI ( Transmitter Terminal Identification Information ) data.

(5) Control over reading and recording mechanisms.

(6) Formation and analysis of protocol data and sequence control.

(7) V21 and V96P/1 MODEM controls.

(8) NCU control.

(9) Operating port control such as key switches, display, etc.

It is to be noted that these data such as scanner data, WE data and V21 and V96P/1 MODEM data are all processed by the CPU through serial-to-parallel or parallel-to-serial conversion.

On the other hand, second system control unit segment SCU II including CPU II takes care of the following functions.

(1) Data MODEM service.

(2) FIFO control constituted by CPU and RAM.

(3) Fill-bit control.

(4) In the control of DCR ( Data Coding and Restoring Section ) random logic which operates as connected to CPU bus.

(a) Setting data into a mode detector comprised of registers and shifters.

(b) Generation of a code in response to interrupt request due to mode detection.

(c) Reading data value of run-length counter.

(d) Other services.

(5) Bus switching control of data RAMs common to CPUs I and II.

(6) Independent synchronization control in G2 mode.

Then, handshake functions between the two system control unit segments SCUs I and II are as follows:

(1) Handshake interface between SCU I and SCU II.

(2) Protocol handshake using RAM I ( or RAM II ). This is the handshake in which instructions are supplied from SCU I to SCU II.

Figure 3:
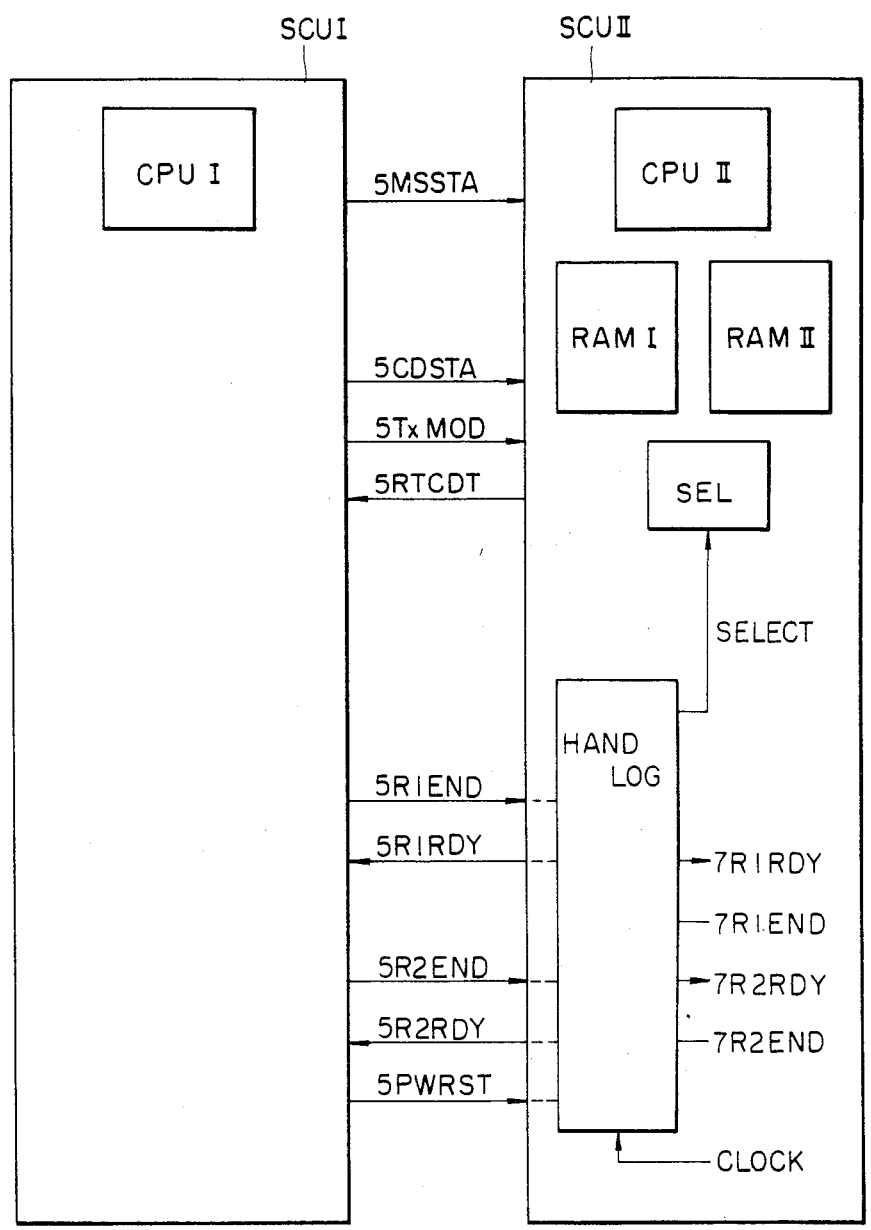
FIG. 3 is a schematic illustration showing the structure of hand-shake interface between the two system control unit segments SCU I and SCU II, which together form a system control unit of the present facsimile machine.

(3) Bus interface between SCU I and SCU II. FIG. 3 is a schematic illustrating the handshake interface between SCU I and SCU II. In FIG. 3, RAMs I and II are shown as provided in the SCU II with "SEL" indicating a selector and "HAND LOG" indicating a handshake logic circuit. Moreover, the function associated with each of the signals shown in FIG. 3 will be explained below with Tx and Rx indicating transmission and receiving modes, respectively.

| (1) | 5R1RDY | |
| --- | --- | --- |
| | Tx: | RAM I WRITE READY |
| | | In this case, RAM I is connected to CPU I bus. |
| | Rx: | RAM I DATA READY |
| | | RAM II is connected to CPU II bus. |
| (2) | 5R1END | |
| | Tx: | RAM I WRITE END |
| | | A strobe signal is generated. |
| | Rx: | RAM I READ END |
| | | A strobe signal is generated. |
| (3) | 5R2RDY | |
| | Tx: | RAM II WRITE READY |
| | | RAM II is connected to CPU I bus. |
| | Rx: | RAM I DATA READY |
| | | RAM I is connected to CPU II bus. |
| (4) | 5R2END | |
| | Tx: | RAM II WRITE END |
| | | A strobe signal is generated. |
| | Rx: | RAM I READ END |
| | | A strobe signal is generated. |
| (5) | 7R1RDY | |
| | Tx: | RAM I DATA READY |
| | | RAM II is connected to CPU I bus. |
| | Rx: | RAM I WRITE READY |

-continued

| | | RAM I is connected to CPU II bus. |
| --- | --- | --- |
| (6) | 7R1END | |
| | Tx: | RAM I READ END |
| | | A strobe signal is generated. |
| | Rx: | RAM I WRITE END |
| | | A strobe signal is generated. |
| (7) | 7R2RDY | |
| | Tx: | RAM II DATA READY |
| | | RAM I is connected to CPU I bus. |
| | Rx: | RAM II WRITE READY |
| | | RAM II is connected to CPU II bus. |
| (8) | 7R2END | |
| | Tx: | RAM II READ END |
| | | A strobe signal is generated. |
| | Rx: | RAM II WRITE END |
| | | A strobe signal is generated. |
| (9) | 5PWRST | |
| | | SCU I POWER ON RESET signal |
| (10) | 5MSSTA | |
| | Tx/Rx: | MODEM SERVICE START command |
| (11) | 5CDSTA | |
| | Tx: | CODING START |
| | | After start of coding, a leading strobe to FIFO is generated and communication is initiated by 5MSSTA. |
| | Rx: | DECODING START |
| | G2: | PHASING SIGNAL SEND command |
| (12) | 5TxMOD | |
| | | Tx MODE INSTRUCTION |
| | | This is a signal indicating possibility to change to protocol handshake by RAM. |
| (13) | 5RTCDT | |
| | Tx: | FIFO FULL:MODEM SERVICE READY |
| | Rx: | RTC SIGNAL DETECTION ADVICE |
| | G2: | PHASING OK |
| (14) | | SELECT signal |
| | H: | Connecting RAM I to CPU I bus. |
| | L: | Connecting RAM II to CPU I bus. |

Figure 4:
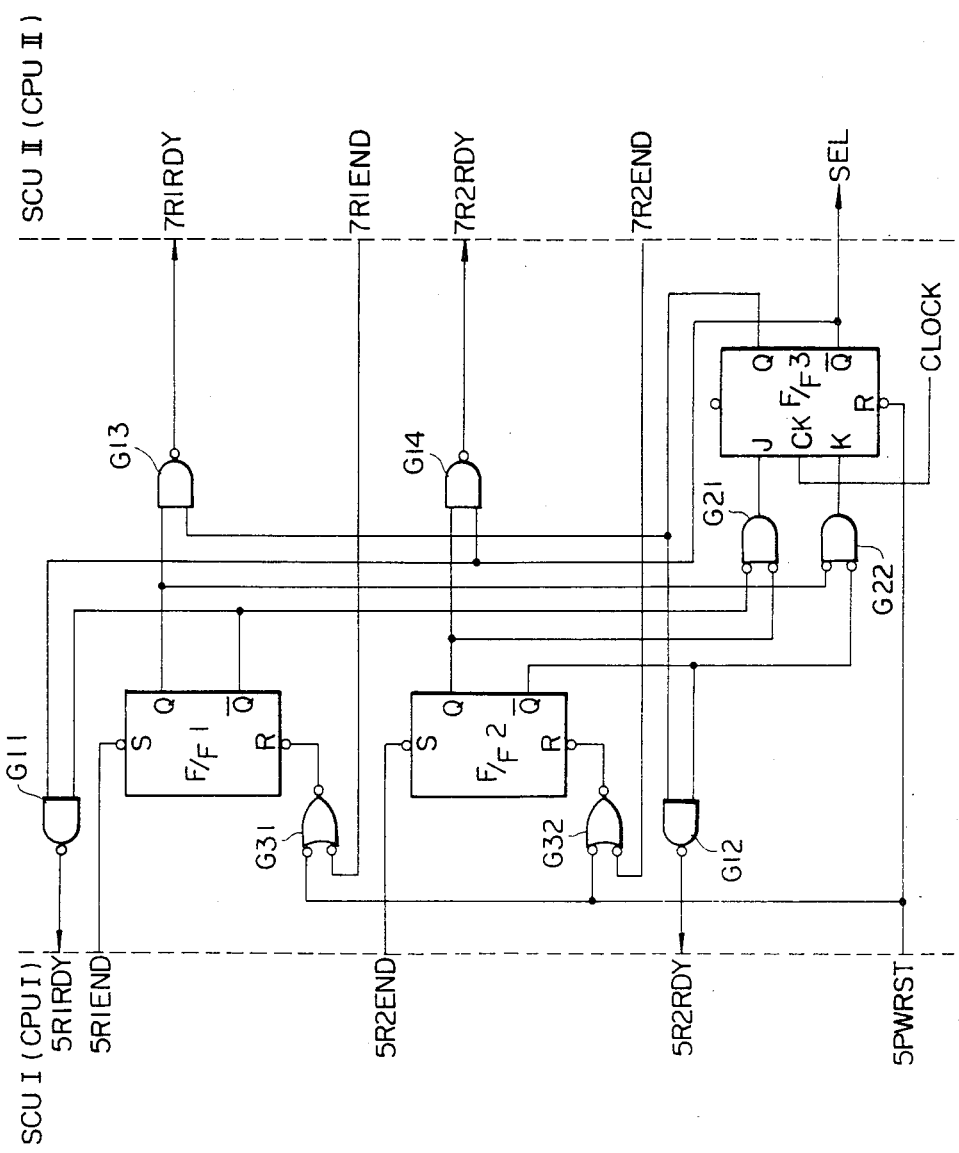
FIG. 4 is a block diagram showing one example of the hand-shake logic circuit "HAND LOG" shown in FIG. 3.

On the other hand, FIG. 4 shows in block form one example of the handshake logic circuit of FIG. 3. As shown, the handshake logic circuit includes RS-flipflops F/F1 and F/F2, a JK-flipflop F/F3, NAND gates G11–G14, AND gates G21 and G22 and NOR gates G31 and G32. Further, FIG. 5 is a time chart useful for explaining operation while the circuit of FIG. 3 is in transmission mode; whereas, FIG. 6 is another time chart useful for explaining operation during receiving mode.

Figure 5:
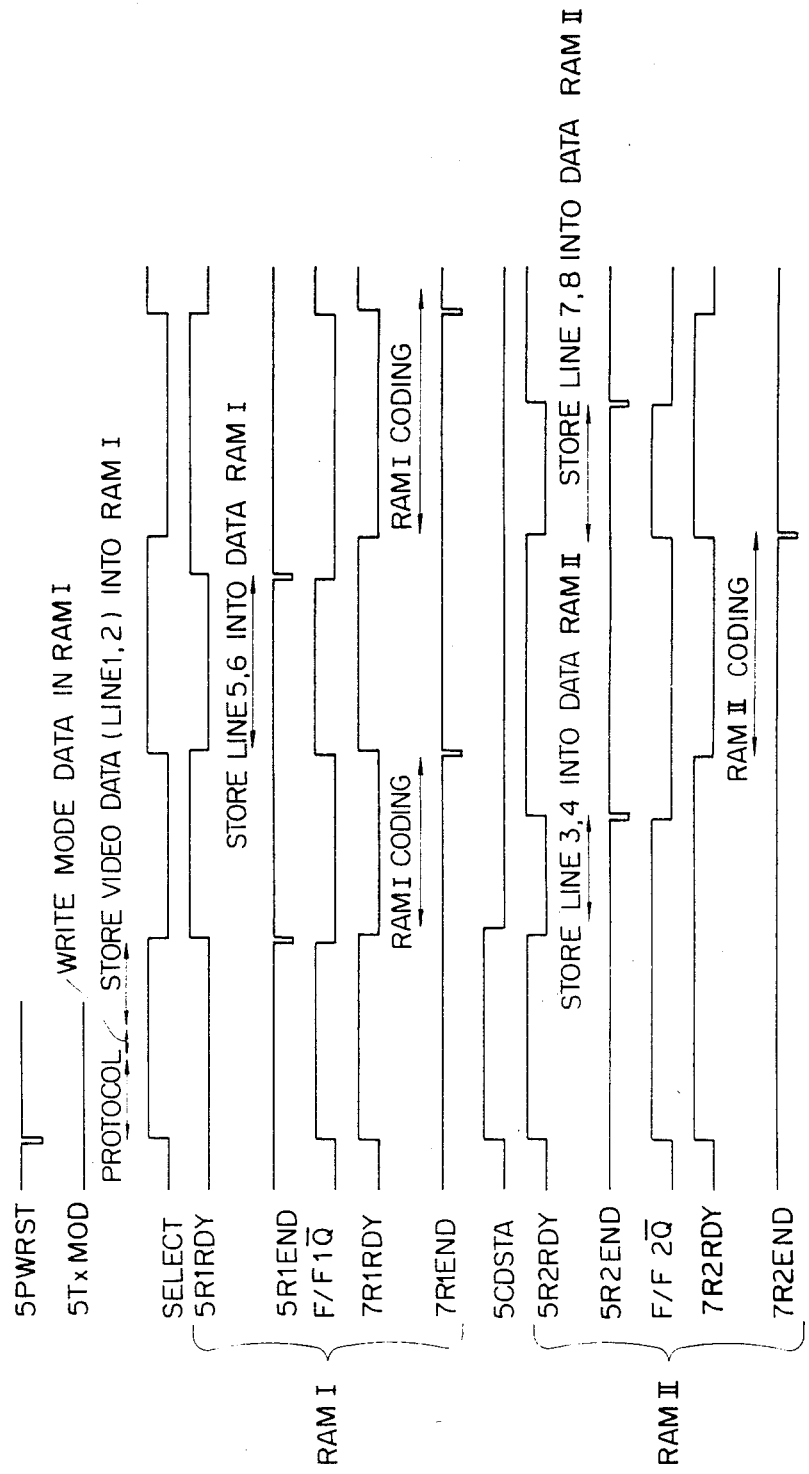
FIG. 5 is a time chart useful for explaining the operation of the structure shown in FIG. 3 while it is in transmission mode.
Figure 6:
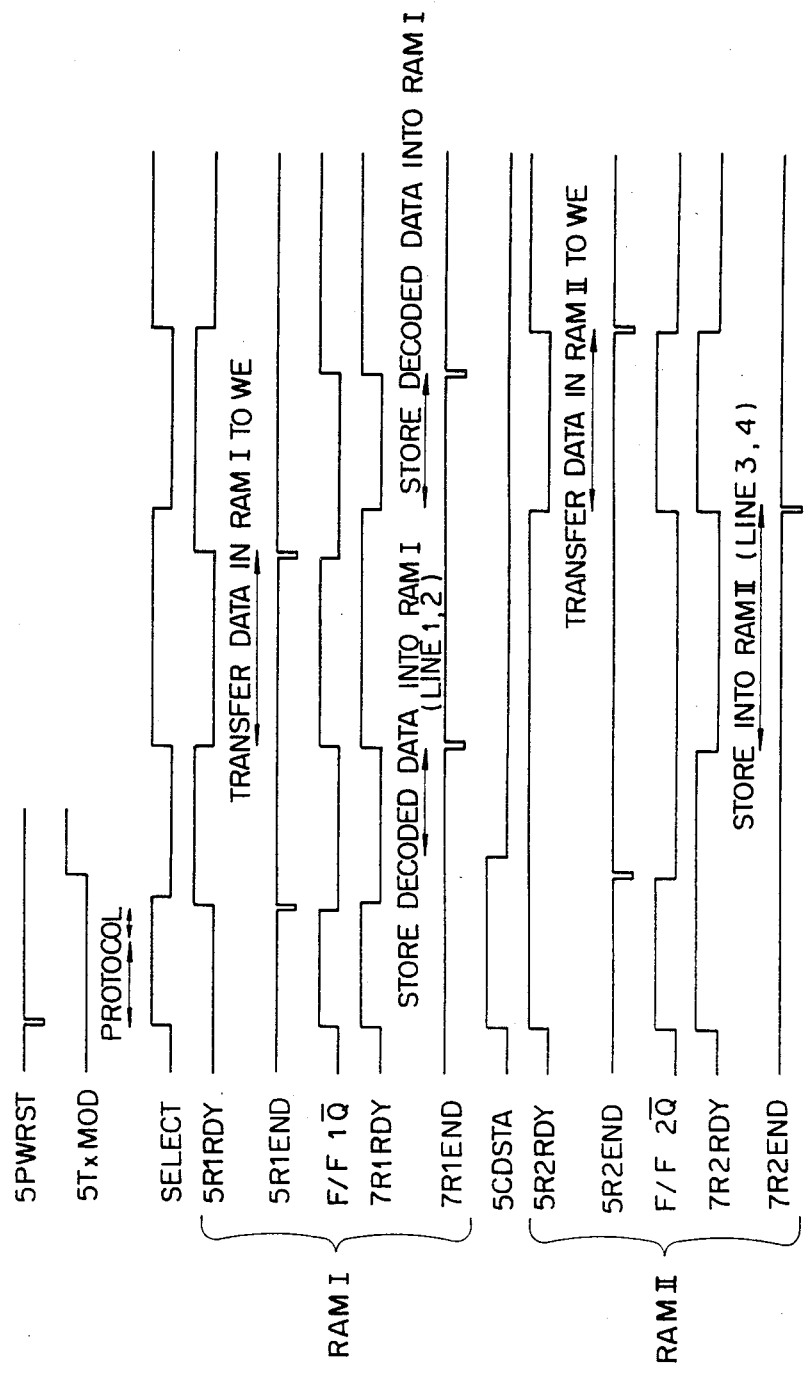
FIG. 6 is a time chart useful for explaining the operation of the structure shown in FIG. 3 while it is in receiving mode.

Described the operation of transmission mode with reference to FIG. 5, SCU I senses a signal of 5R1RDY ( 5R2RDY ), for example, for every 5 milliseconds and causes picture data to be stored into RAM I ( RAM II ).

In the first place, at the rising end of SCU I power on reset signal 5PWRST, protocol is initiated, and, at the same time, the select signal becomes high level. For this reason, RAM I becomes connected to CPU I bus. Upon termination of protocol, mode data is fed into RAM I, followed by the step of storing picture data of first and second lines into RAM I. Similarly, at the rising end of 5PWRST, $\bar{Q}$ output of F/F1, 7R1RDY, 5CDSTA, 5R2RDY, $\bar{Q}$ output of F/F2, and 7R2RDY in FIG. 4 all become high level.

Upon completion of storing data into RAM I, a signal of 5R1END is generated, and, at the rising end of its signal, $\bar{Q}$ output of F/F1 becomes low in level. Then, the SELECT signal also becomes low in level, so that RAM II becomes connected to CPU I bus. In this case, RAM I is also switched to CPU II bus. When SELECT signal becomes low in level, 5R2RDY also becomes low level, whereby picture data of third and fourth lines are stored into RAM II. At the same time, 7R1RDY also becomes low in level to initiate coding operation, so that the picture data of first and second lines stored into RAM I become coded. After elapsing a predetermined period of time subsequent to the start of coding operation, 5CDSTA becomes low level thereby initiating communication.

Upon completion of storing data into RAM II, a signal of 5R2END is generated, and, at the falling end of this signal, $\overline{Q}$ output of F/F2 becomes low level. Then, upon completion of coding the data stored in RAM I, a signal of 7R1END is generated, and, at the falling end of this signal, SELECT signal becomes high level, so that RAMs I and II are again connected to CPU I and II buses, respectively. At the same time, $\overline{Q}$ output of F/F1 also becomes high level. On the other hand, at the rising end of 7R1END, 5R1RDY becomes low level thereby causing the picture data of fifth and sixth lines to be stored into RAM I, and, at the same time, 7R2RDY also becomes low level thereby causing the data of third and fourth lines previously stored into RAM II to be coded.

Upon completion of storage of data into RAM I, a signal of 5R1END is generated, and, at the falling end of this signal, $\overline{Q}$ output of F/F1 becomes low level. Then, when the coding operation for the data stored in RAM II has been completed, there is generated a signal of 7R2END, and, at the falling end of this signal, SELECT signal becomes low level, so that the CPU buses for RAMs I and II are switched and at the same time $\overline{Q}$ output of F/F2 becomes high level. Then, at the rising end of 7R2END signal, both of 7R1RDY and 5R2RDY signals become low level, so that the picture data of fifth and sixth lines stored into RAM I are coded, and, simultaneously therewith picture data of seventh and eighth lines are stored into RAM II. Thereafter, the similar operation is repetitively carried out.

In this manner, during transmission mode, SCU I for controlling the write-in operation of picture data read by a scanner into a memory and SCU II for controlling the coding operation of picture data stored in the memory are switchingly connected to RAMs I and II for every two lines, for example, alternately to carry out parallel processing of different functions.

Now, referring to FIG. 6 which shows the sequence of operation while the machine is in receiving mode, after transferring mode data to SCU II using RAM I, SCU I produces 5R2END as a dummy signal, which then causes the control of selector to be transferred to SCU II. Then, SCU I keeps sensing 7R1RDY ( 7R2RDY ), for example, at the I/O period of 7.5 ms., whereby the decoded data are transferred to the WE section.

In the first place, when a signal of 5PWRST is inputted, protocol is initiated. At the same time, at the falling end of this 5PWRST signal, SELECT signal becomes high level, so that RAMs I and II are connected to CPU I and II buses, respectively. Then, the mode data inputted following the protocol are stored into RAM II. On the other hand, at the rising end of 5PWRST signal, $\overline{Q}$ output of F/F1, 7R1RDY, 5CDSTA, 5R2RDY, $\overline{Q}$ output of F/F2 and 7R2RDY are all set to high level.

Upon completion of storing of the mode data into RAM II, a signal of 5R1END is generated from SCU I, and, at the falling end of this signal, $\overline{Q}$ output of F/F1 becomes low level and SELECT signal also becomes low level, so that RAM I is switched to CPU I bus and RAM II is switched to CPU I bus. Furthermore, 7R1RDY signal also becomes low level thereby enabling decoded data to be written into RAM I. Under the condition, when a dummy signal of 5R2END is produced from SCU I, in association with the falling end of this signal, $\overline{Q}$ output of F/F2 becomes low level, and, at the same time, 5TxMOD signal becomes high level. Then, after elapsing a predetermined time period, 5CDSTA signal becomes low level thereby causing decoding operation to be initiated, so that the decoded data of first and second lines are stored into RAM I.

Upon completion of storing data into RAM I, 7R1END signal is produced, and, at the falling end of this signal, $\overline{Q}$ output of F/F1 becomes high level and SELECT signal also becomes high level, so that RAM I is switched to CPU I bus and RAM II is switched to CPU II bus. Then, at the rising end of 7R1END signal, 5R1RDY and 7R2RDY signals become low level simultaneously. For this reason, the decoded data of first and second lines stored in RAM I are then transferred to the WE section; on the other hand, the decoded data of third and fourth lines are stored into RAM II. Upon completion of transfer of data from RAM I, 5R1END is generated, and, at its falling end, $\overline{Q}$ output of F/F1 becomes low level with 5R1RDY set to high level. When the operation of storing decoded data into RAM II has been finished, 7R2END is produced, and, at its falling end, $\overline{Q}$ output of F/F2 becomes high level and SELECT signal becomes low level, so that RAMs I and II are connected to CPU I and II buses, respectively.

Then, at the rising end of 7R2END, both of 5R2RDY and 7R1RDY become low level simultaneously, so that the decoded data stored in RAM II are transferred to the WE section; whereas, the decoded data of fifth and sixth lines are stored into RAM I. Upon completion of storing data into RAM I, 7R1END is generated, and 5R2END is generated when the transfer of data stored in RAM II has been completed, whereby the connections to CPU buses are switched.

The receiving mode of operation is carried out as described above. That is, in receiving mode, SCU II for controlling the coding operation and SCU I for controlling the transfer of data to WE section are alternately connected to RAMs I and II in carrying out parallel processing.

Figure 7:
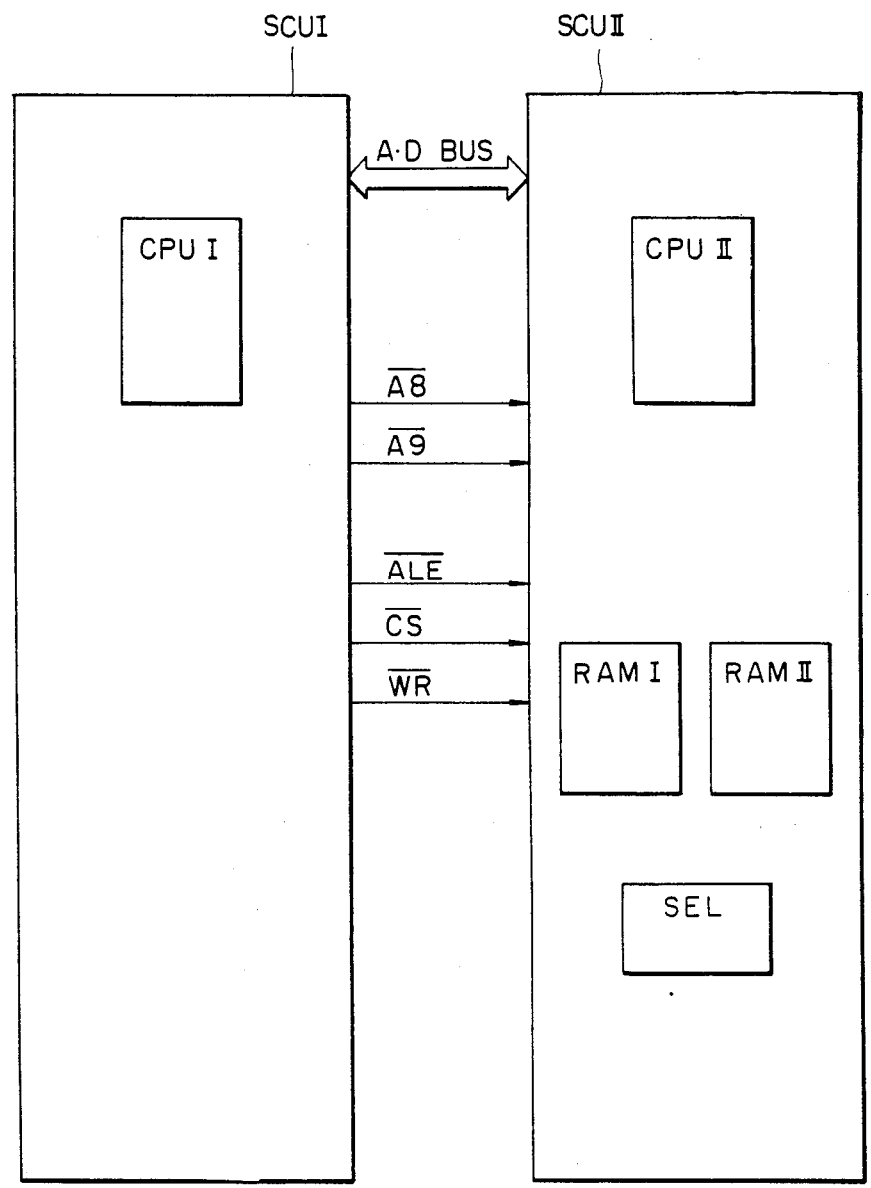
FIG. 7 is a schematic illustration showing the structure of bus interface between the two system control unit segments SCU I and SCU II.
Figure 8:
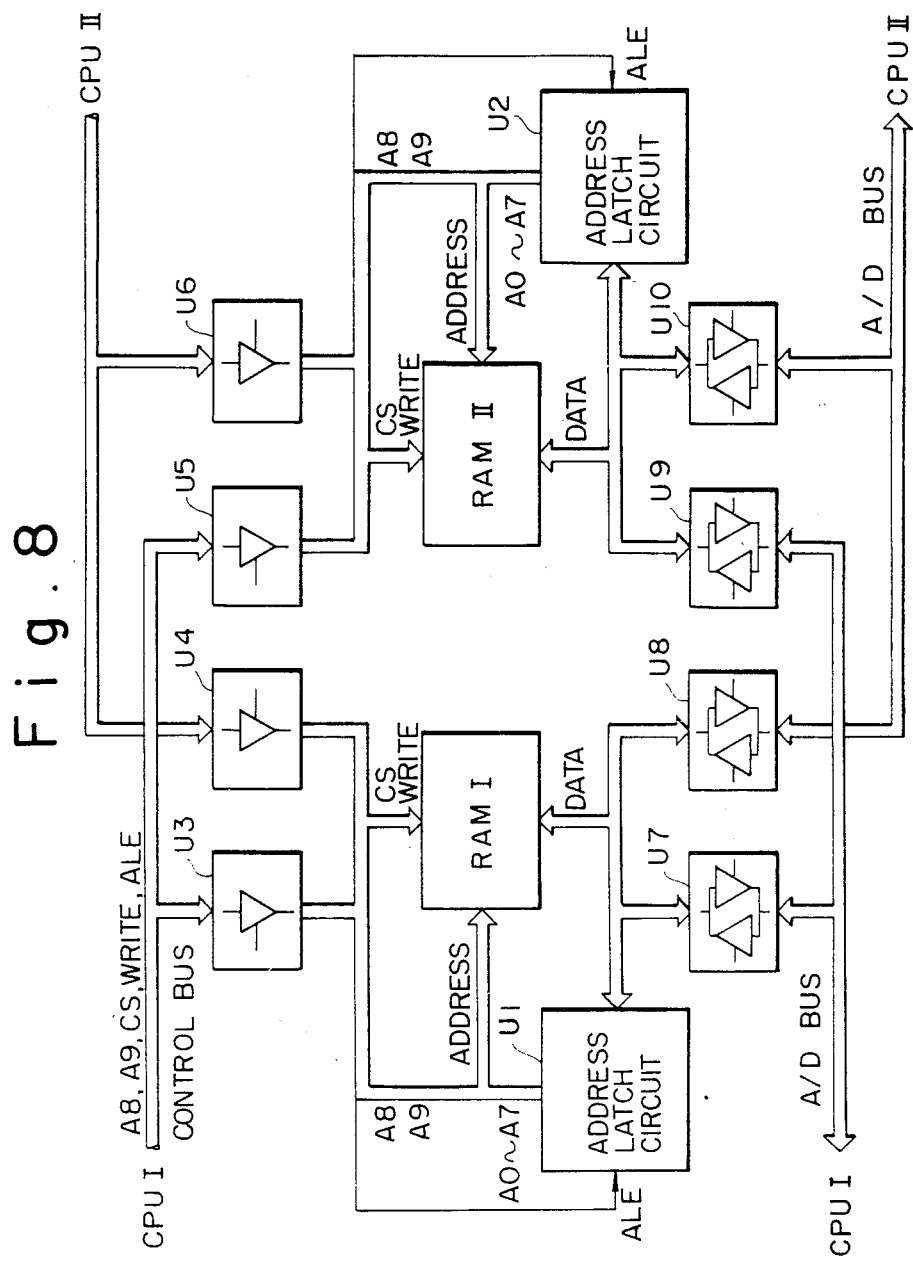
FIG. 8 is a functional block diagram showing how the connection of control, data and address buses to the pair of RAM blocks is controlled.

FIG. 7 is a schematic illustrating the bus interface structure between SCUs I and II. It is to be noted that like numerals indicate like elements as in FIG. 3. FIG. 8 is a functional block diagram showing how address/data and control buses are switchingly connected to a pair of RAM blocks provided in the present facsimile machine. In FIG. 8, RAMs I and II are memory blocks with U1 and U2 indicating address latch circuits, U3–U6 indicating input circuits and U7–U10 indicating input/output circuits.

Figure 9:
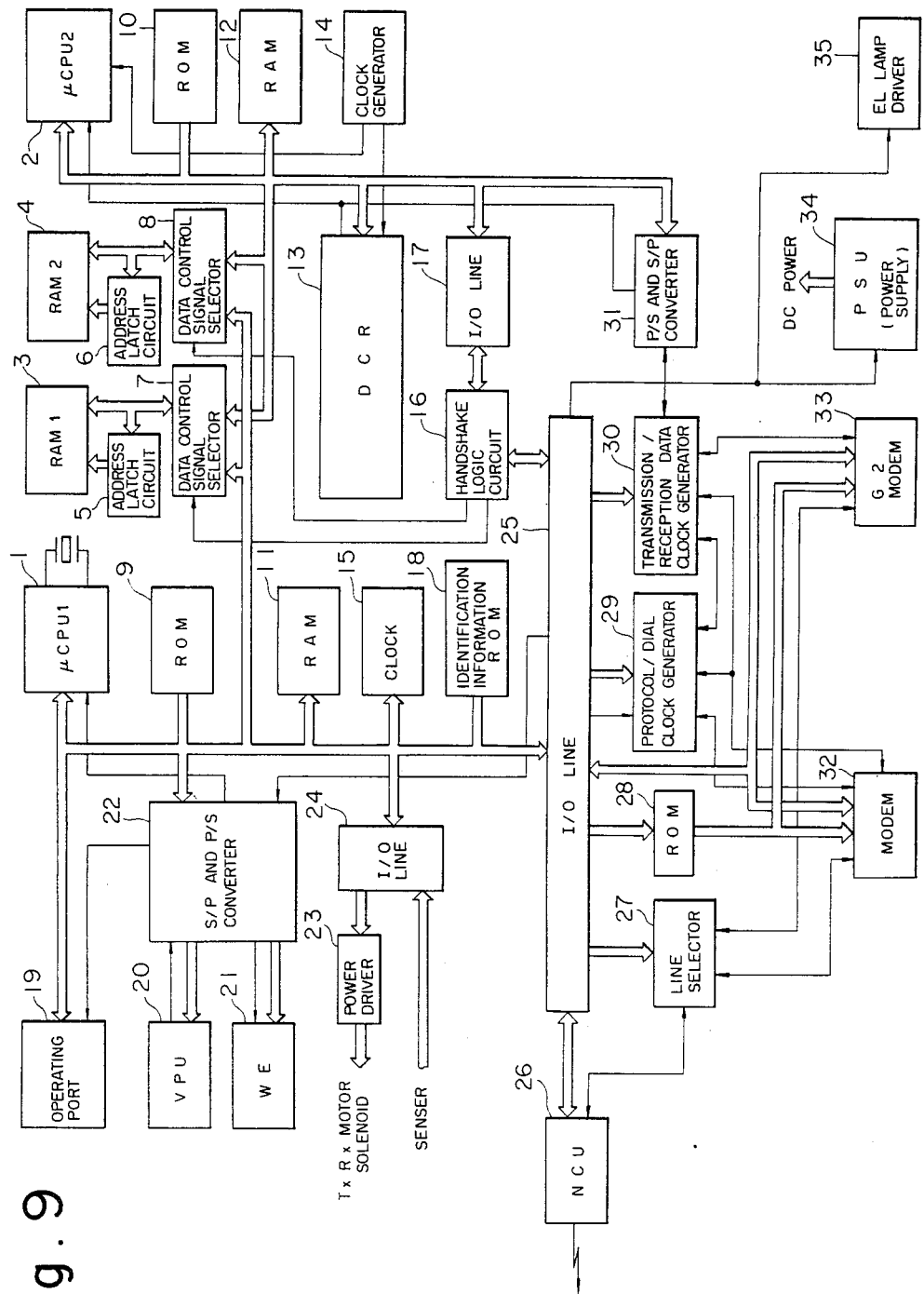
FIG. 9 is a functional block diagram showing the system structure of the present facsimile machine.

FIG. 9 shows in functional block form the system structure of the present facsimile machine. As shown, "1" indicates a first micro-CPU, "2" a second micro-CPU, "3" and "4" first and second RAMs, respectively, "5" and "6" address latch circuits, "7" and "8" data/control signal selectors, "9" a ROM for storing a program and character pattern, "10" a ROM for storing a program, "11" and "12" RAMs to be used as rate changing FIFO buffers, "13" a DCR ( Data Coding and Restoring ) device, "14" a clock generator, "15" a clock, "16" a handshake logic circuit, "17" an I/O line, "18" an identification information ROM, "19" an operating port, "20" a VPU ( reading and processing unit ), "21" a WE ( Write Enable ) section, "22" an serial-toparallel and parallel-to-serial converter, "23" a power driver, "24" and "25" I/O lines, "26" an NCU ( Net Control Unit ), "27" a line selector, "28" a ROM ( Read Only Memory ), "29" a protocol dial clock generator, "30" a transmission and reception data clock generator, "31" an S/P and P/S converter, "32" a high-speed MODEM such as V96P/1 and V21, "33" a G2 MODEM, "34" a PSU ( Power Supply Unit ), and "35" an EL lamp driver.

As described before with reference to FIG. 1, in the circuit shown in FIG. 9, the first micro-CPU1 1 is mainly in charge of reading operation during transmission mode and of recording operation during reception mode and the second micro-CPU2 2 is mainly in charge of coding the data to be transmitted and of decoding the data received. Further, there are provided a pair of RAM1 3 and RAM2 4 which form RAM blocks for storing, for example, picture data of two lines and control signals such as protocol. Address latch circuits 5 and 6 are provided as connected to these RAMs RAM1 and RAM2, and also provided as connected to these are data/control signal selectors 7 and 8. The remaining portion of this circuit shown in FIG. 9 should be obvious for those skilled in the art.

Described more in detail as to the structure and operation of the circuit shown in FIG. 9, the operating port 19 is provided with switches, dials, displays, etc. When dialing operation is carried out for transmission of data, signals are supplied by I/O line 25, line selector 27 and NCU 26, and, thus, the sequence of steps such as call connection with the receiving terminal, protocol establishment, mode setting, etc. follow. Under the control of the first micro-CPU1 1, picture data read by a scanner ( not shown ) are transferred through VPU 20 and S/P and P/S converter 22 and stored into RAM1 3 or RAM2 4 in sequence.

The data thus stored into RAM1 3 and RAM2 4 are coded according to the MH or MR coding method by DCR 13 under the control of second micro-CPU2 2, and the thus coded data are then stored into RAM 12. The coded data stored in RAM 12 are then transmitted to the receiving terminal after having been passed through data/control signal selector 7 or 8, I/O line 25, ROM 28, MODEM 32 and NCU 26.

On the other hand, during receiving mode, signals transmitted from the transmitter terminal are first received by NCU 26 controlled by CPU1 1 and then after passing through I/O line 25, MODEM 32 controlled by CPU2 2, I/O line 25, data/control signal selector 7 or 8 and RAM 12 and, therefore, coded data thus received are temporarily stored into RAM 12. Then, the thus stored coded data are decoded by DCR 13 under the control of CPU2 2, and the thus decoded data are then stored into RAM1 3 or RAM2 4. The decoded data thus stored in these RAM1 3 and RAM2 4 are fed into WE section 21 through S/P and P/S converter 22 under the control of CPU1 1, from where the data are supplied to a recording head ( not shown ) for recording an image on a recording medium.

As described in detail above, in accordance with a facsimile machine of the present invention, a system control unit includes a pair of central processing units ( CPUs ) to which are assigned predetermined functions, and, moreover, there are provided a pair of line memory blocks to which are alternately connected the respective CPUs through switches according to the mode of operation of the machine, transmission or reception. As a result, in accordance with the present invention, the time period of data transfer into line memories may be omitted, and the time period for implementing parallel processing of reading and coding operations during transmission mode and of decoding and recording operations during receiving mode may be increased, so that the operational speed may be increased at least as twice as that of the prior art.

While the above provides a full and complete disclosure of the preferred embodiments of the present invention, various modifications, alternate constructions and equivalents may be employed without departing from the true spirit and scope of the invention. Therefore, the above description and illustration should not be construred as limiting the scope of the invention, which is defined by the appended claims.

What is claimed is:

1. A facsimile communication machine having a transmission mode and a receiving mode, comprising:

A pair of memories each capable of temporarily storing picture data, coded or uncoded;

reading means for reading an original image to be transmitted to produce first uncoded picture data;

coding means for converting said first uncoded picture data into first coded picture data to be transmitted;

decoding means for converting second coded picture data received by said machine from a remote terminal into second uncoded picture data;

recording means for recording said second uncoded picture data in a visual format; and a system control unit for controlling the operation of said machine, said system control unit including a first central processing unit (CPU) for controlling the operation of at least said reading and recording means and a second central processing unit (CPU) for controlling the operation of at least said coding and decoding means, said first and second central processing units being switchingly connectable to said pair of memories, respectively, thereby allowing to operate one of said reading and recording means and one of said coding and decoding means in parallel.

2. A machine of claim 1, wherein while said first central processing unit is connected to one of said pair of memories, said second central processing unit is connected to the other of said pair of memories.

3. A machine of claim 2, wherein while said machine is in transmission mode, said first central processing unit controls the operation of said reading means and said second central processing unit controls the operation of said coding means.

4. A machine of claim 3, wherein said first and second central processing unit are alternately connected to respective ones of said pair of memories.

5. A machine of claim 2, wherein while said machine is in receiving mode, said first central processing unit controls the operation of said recording means and said second central processing unit controls the operation of said decoding means.

6. A machine of claim 5, wherein said first and second central processing units are alternately connected to respective ones of said pair of memories.

* * * * *